(12) United States Patent
Stewart et al.

(10) Patent No.: US 9,046,657 B2
(45) Date of Patent: Jun. 2, 2015

(54) SYSTEMS AND METHODS FOR REDUCING OFF-AXIS OPTICAL ABERRATIONS IN WAVELENGTH DISPERSED DEVICES

(71) Applicant: Finisar Corporation, Horsham, PA (US)

(72) Inventors: Luke Stewart, Gladesville (AU); Glenn Wayne Baxter, Hornsby Heights (AU)

(73) Assignee: Finisar Corporation, Horsham, PA (US)

( * ) Notice: Subject to any disclaimer, the term of this patent is extended or adjusted under 35 U.S.C. 154(b) by 163 days.

(21) Appl. No.: 13/716,192

(22) Filed: Dec. 16, 2012

(65) Prior Publication Data

US 2013/0177272 A1    Jul. 11, 2013

Related U.S. Application Data

(60) Provisional application No. 61/579,564, filed on Dec. 22, 2011.

(51) Int. Cl.
*G02B 6/00* (2006.01)
*G02B 6/35* (2006.01)
*G02B 6/293* (2006.01)
*G02B 6/27* (2006.01)

(52) U.S. Cl.
CPC .............. *G02B 6/354* (2013.01); *G02B 6/3594* (2013.01); *G02B 6/29397* (2013.01); *G02B 6/356* (2013.01); *G02B 6/2793* (2013.01); *G02B 6/2931* (2013.01); *G02B 6/29373* (2013.01)

(58) Field of Classification Search
None
See application file for complete search history.

(56) References Cited

U.S. PATENT DOCUMENTS 6,327,019 B1 * 12/2001 Patel et al. .................. 349/196
2002/0131691 A1 * 9/2002 Garrett et al. ................ 385/24

FOREIGN PATENT DOCUMENTS

WO        03/032071 A1    4/2003
WO    2004/005993 A1    1/2004

OTHER PUBLICATIONS

"Supplementary Search Report" for EP 05749258.9-2217/1766819, Jan. 21, 2013, European Patent Office, Munich, Germany.

* cited by examiner

*Primary Examiner* — Tina Wong
(74) *Attorney, Agent, or Firm* — Kurt Rauschenbach; Rauschenbach Patent Law Group, LLC

(57) ABSTRACT

Through its higher refractive index, a silicon grism can be used to reduce the Described herein are systems and methods for reducing optical aberrations in an optical system to decrease polarization dependent loss. Embodiments are provided particularly to define beam trajectories through an optical switching system which reduce off-axis aberrations. In one embodiment, a silicon grism is provided for reducing the curvature of the focal plane at an LCOS device in a wavelength selective switch (WSS) such that the separated polarization states converge at the LCOS at substantially the same point along the optical axis for all wavelengths. In this embodiment, an axial offset at the LCOS device will not produce large PDL at the coupling fibers. In another embodiment, a coupling lens having an arcuate focusing region is provided to address an offset in the optical beams, such that the separated polarization states couple symmetrically to respective output fibers.

22 Claims, 17 Drawing Sheets

(Prior Art)

SYSTEMS AND METHODS FOR REDUCING OFF-AXIS OPTICAL ABERRATIONS IN WAVELENGTH DISPERSED DEVICES

CROSS REFERENCE TO RELATED APPLICATIONS

The present application is a non-provisional of U.S. Provisional Patent Application Ser. No. 61/579,564, filed Dec. 22, 2011. The entire contents of U.S. Provisional Application Ser. No. 61/579,564, is herein incorporated by reference.

FIELD OF THE INVENTION

The present invention relates to optical systems and in particular to systems and methods for reducing off-axis optical aberrations in wavelength dispersed optical devices/systems. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Optical systems suffer loss due to various forms of optical aberration, which lead to loss in signal information. In smaller, simpler optical devices, beams can be propagated along trajectories closely parallel to the optical axis. In these "paraxial" configurations, aberrations are small and can generally be ignored in practice. However, as more complex devices are built to perform advanced functions, the need to propagate beams off-axis and outside the paraxial region is becoming increasingly important. In these "higher order optics" situations, a number of monochromatic optical aberrations become more distinct. In particular, off-axis curvature of the focal plane of optical elements becomes a concern. So too does spherical aberration.

Specifically, in the field of optical add/drop multiplexers and switches, devices are being developed with higher numbers of input and output ports. These ports are disposed in linear arrays that extend transversely across the optical axis. Therefore, with higher port count devices, fibers extend further from the optical axis and switching optical beams to those fibers means that the effects of optical aberrations become greater.

Another issue contributing to aberrations is the size and profile of an optical beam. In switching devices it is often advantageous to reshape the beam profile to be highly asymmetric. For example, in liquid crystal on silicon (LCOS) based switches, elongate beam profiles are advantageous for efficiently switching many wavelength channels simultaneously. Larger and more asymmetric beams generally experience higher aberrations than smaller symmetric beams.

Further, in some optical switching devices, it is advantageous for individual wavelengths and polarization states to be spatially separated and propagated independently. In these cases, monochromatic aberrations sometimes lead to various forms of optical loss, including wavelength dependent loss, polarization dependent loss (PDL) and port dependent loss. These effects are undesirable from a performance point of view.

Attempts have been made to individually address the resulting losses incurred in these systems. For example, U.S. Pat. No. 6,813,080 entitled "Metal-free gratings for wavelength-multiplexed optical communications" to Raguin and Marciante (Assigned to Corning Incorporated) discloses a diffraction grating formed of layers of two types of silicon based material having different refractive indices to reduce PDL. A grism utilizing such a grating and being formed primarily of silicon is also proposed. By forming the diffraction grating from particular material layers, U.S. Pat. No. 6,813,080 seeks to reduce the PDL that the dispersive device itself introduces.

However, to the inventors' knowledge, no suitable techniques have been developed to actively address the above-mentioned aberrations at a system level, particularly in higher port count optical devices and devices incorporating asymmetric beams profiles. In particular, the device of U.S. Pat. No. 6,813,080 is not suitable for reducing loss in an optical system other than the PDL specifically introduced by an alternative grating/grism.

As an example of optical loss resulting from aberration, PDL is the relative attenuation experienced between constituent polarization components of an optical signal in propagation through an optical device or system. One specific definition of PDL is the peak to peak difference in transmission of an optical signal relative to all possible polarization states, after propagating through a device or system. That is:

$$PDL(dB) = 10\log\log_{10}\left(\frac{P_{max}}{P_{min}}\right)$$

PDL is wavelength dependent and is particularly prominent at high data rate transmission. Unlike other types of optical loss, PDL cannot be easily compensated for by simple amplification. PDL is enhanced in optical systems where polarization states are required to be spatially separated for polarization diversity purposes. Such systems include those that possess polarization dependent components, including liquid crystal elements. Many commonly used wavelength selective switch (WSS) devices fall into this category.

Therefore, as optical systems emerge that can operate at ultra-high data rates, and across large numbers of wavelength channels, it is becoming increasingly important to efficiently manage aberrations that give rise to loss such as PDL.

SUMMARY OF THE INVENTION

It is an object of the present disclosure, in preferred forms, to provide improved or alternative systems and methods for reducing off-axis optical aberrations in wavelength dispersed devices.

In accordance with a first aspect of the present disclosure there is provided an optical system including:
- (a) at least one input port for projecting an input optical beam;
- (b) a beam splitting element for spatially separating said optical beam into a plurality of optical sub beams disposed in a first dimension;
- (c) a plurality of output ports disposed in a second dimension for receiving optical beams;
- (d) an optical power element for manipulating the beam profiles of said optical sub beams;
- (e) a switching element for selectively switching said optical sub beams along trajectories relative to a central optical axis to predetermined ones of said output ports; and (f) a passive beam correcting element for selectively defining trajectories which reduce optical aberrations in said system arising from beam propagation off the central optical axis.

The optical aberrations corrected for preferably include curvature of the focusing of the optical power element for sub beams propagating along trajectories relative to the optical axis in the first dimension.

Preferably the optical system further includes a polarization diversity element for spatially separating and recombining orthogonal polarization states from the input optical beam and wherein the passive beam correcting element corrects for position dependent focusing, by the optical power element, of spatially separated polarization states in the first dimension to reduce polarization dependent loss (PDL).

The beam splitting element is preferably a diffracting element for spatially separating individual wavelength channels, as optical sub beams, from the optical beam in the first dimension. In one embodiment, the passive beam correcting element and the beam splitting element are preferably integral with each other in the form of a grating-prism (grism) element. The grism element is preferably formed substantially entirely of silicon.

In another embodiment, the passive beam correcting element preferably includes a corrective coupling lens having focal properties that vary in the second dimension. The corrective coupling lens preferably has a collimating region that varies in position in the first dimension as a function of distance in the second dimension. The collimating region of the corrective coupling lens is preferably arcuate extending longitudinally in the second dimension and is curved in the first dimension. The curvature of the collimating region preferably has a radius of curvature in the range 1 m to 10 m.

In accordance with a second aspect of the present disclosure, there is provided a method of routing optical beams between a first port and a set of second ports of an optical system, said method including the steps of:

projecting an optical beam from said first port;
defining trajectories relative to a central optical axis between said first port and predefined ones of said second ports;
splitting said optical beam into a plurality of optical sub beams spatially separated in a first dimension;
manipulating the beam profiles of said optical sub beams in a predefined manner;
selectively switching said optical sub beams along said trajectories to selected ones of said second ports disposed in a second dimension; and
selectively passively correcting said trajectories to reduce optical aberrations in said system arising from beam propagation off the central optical axis.

The trajectories are preferably passively corrected in the first dimension. More preferably, the trajectories are passively corrected based on the position of the corresponding output port in a second dimension. The passive correction preferably increases with increasing distance of the corresponding output port from the central optical axis.

The step of splitting the optical beam preferably includes passing the beam through a diffractive element to output sub beams spatially separated by wavelength. The diffractive element is preferably a grating-prism combination (grism) formed entirely from silicon and configured to reduce the angle of incidence of the sub beams onto the switching element.

The trajectories are preferably corrected by passing the sub beams through a corrective coupling lens having focal properties that vary in the second dimension. The corrective coupling lens preferably has a collimating region that varies in position in the first dimension as a function of distance in the second dimension.

Each optical beam is preferably spatially separated into constituent orthogonal polarization states for propagation through the system, and wherein the trajectories of the separated polarization states are selectively passively corrected for reducing polarization dependent loss (PDL).

In accordance with a third aspect of the present disclosure, there is provided an optical lens for reducing optical field curvature aberrations, the lens including a longitudinally extending arcuate collimating region having optical power in at least one dimension.

The arcuate collimating region is preferably a convex ridge disposed in a face of the lens. The arcuate collimating region preferably has a longitudinal arced radius of curvature in the range 1 m to 10 m.

In accordance with a fourth aspect of the present disclosure, there is provided a method of reducing the off-axis trajectory of a wavelength dispersed signal in an optical system, the method including the steps of:

projecting at least one input optical beam in a direction of an optical axis;
utilizing a grism having a refractive index higher than glass to spatially disperse, according to wavelength, individual channel signals from said at least one input optical beam; and
receiving said spatially dispersed channel signals;
wherein the grism is positioned to selectively define trajectories of said channel signals which reduce optical aberrations in said system arising from signal propagation off the optical axis.

The grism is preferably formed entirely from a single material having a refractive index greater than 3 at a wavelength of 1550 nm. The grism material is preferably silicon.

The channel signals are preferably spatially dispersed in a first dimension and the trajectories are preferably selectively defined in the first dimension. The channel signals are preferably coupled to corresponding output ports disposed in a second dimension and the trajectories are preferably selectively defined based on the position of the corresponding output port in the second dimension.

Each optical beam is preferably spatially separated into constituent orthogonal polarization states for propagation through the system, and wherein the trajectories of the polarization states are selectively defined for reducing polarization dependent loss (PDL).

BRIEF DESCRIPTION OF THE DRAWINGS

Preferred embodiments of the disclosure will now be described, by way of example only, with reference to the accompanying drawings in which.

DETAILED DESCRIPTION

Outline of the Relevant Optical Systems

Figure 1:
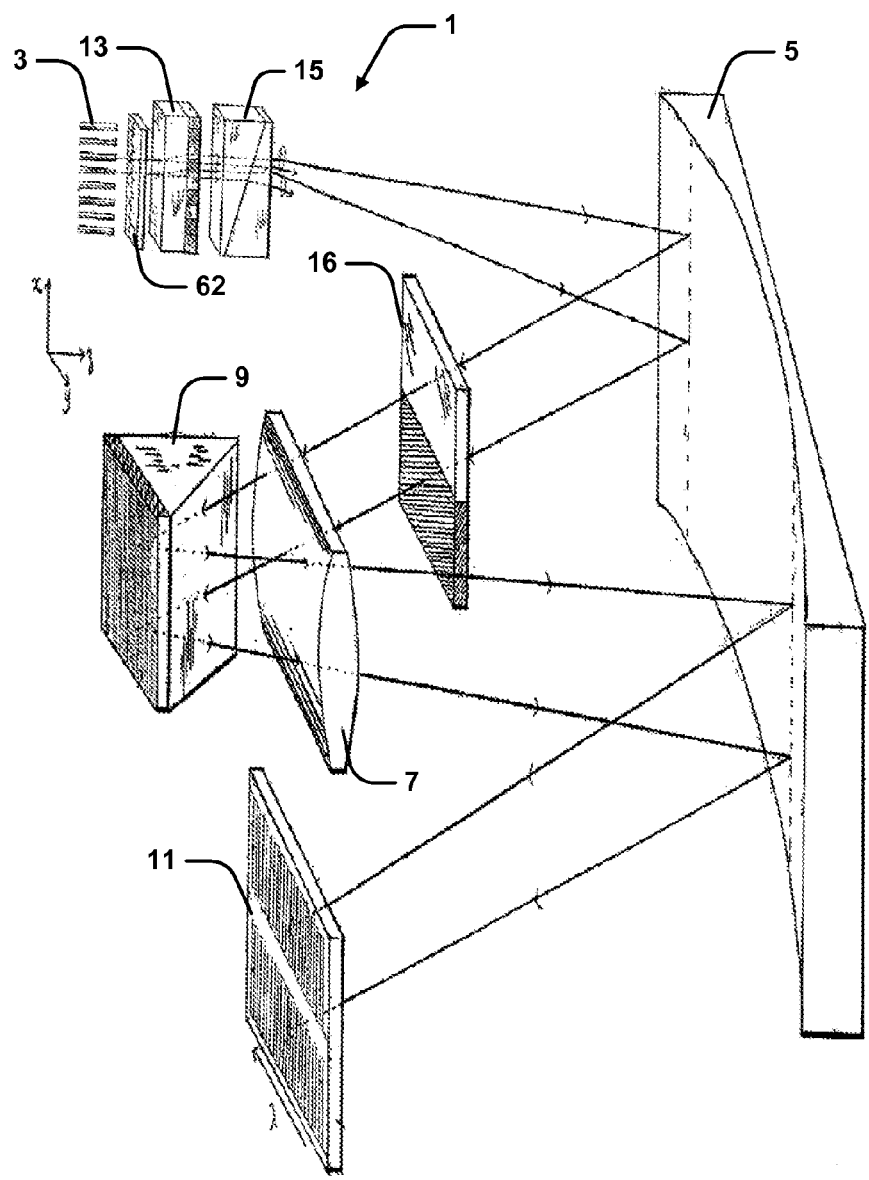
FIG. 1 is a schematic view of a first prior art WSS device.
Figure 2:
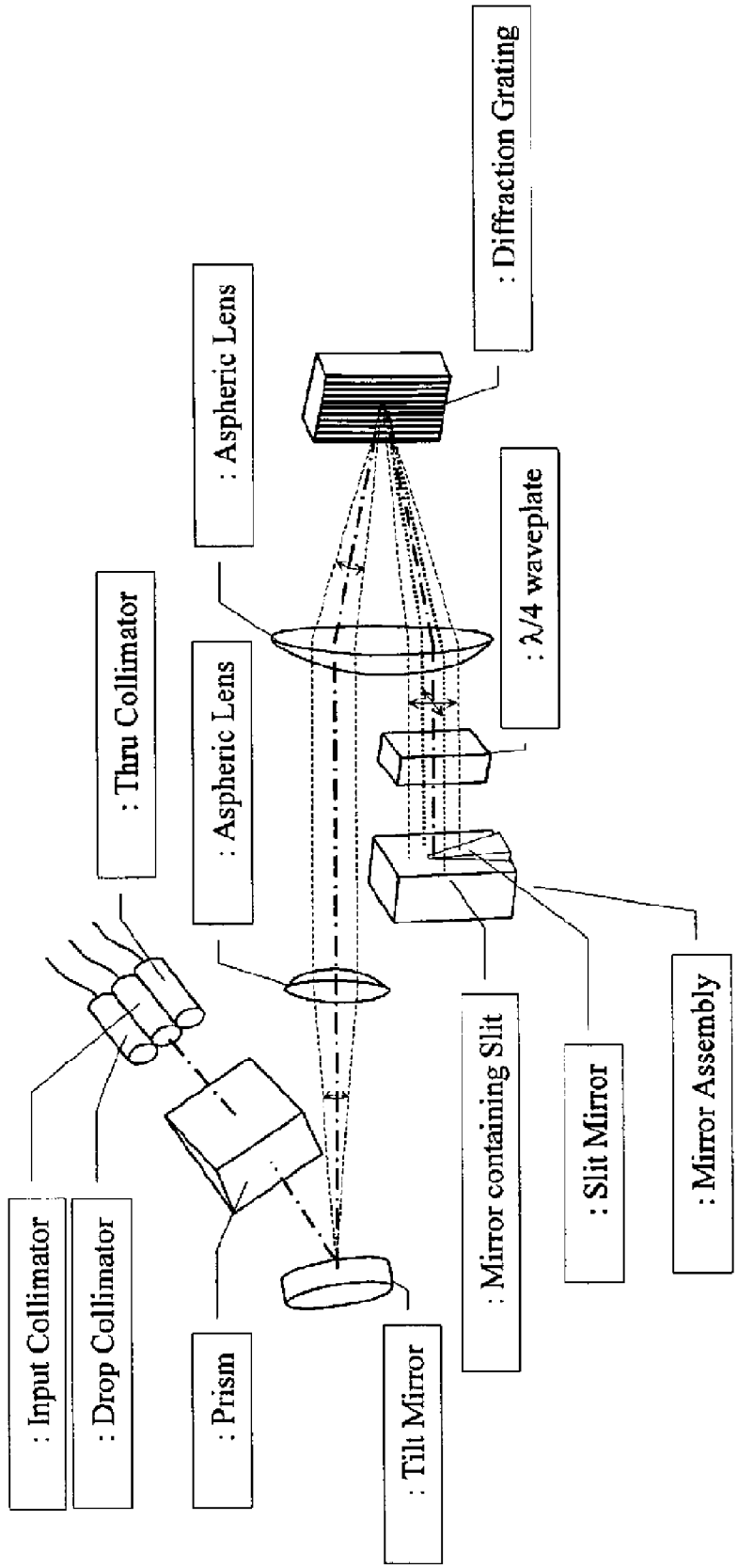
FIG. 2 is a schematic view of a second prior art WSS device.
Figure 3:
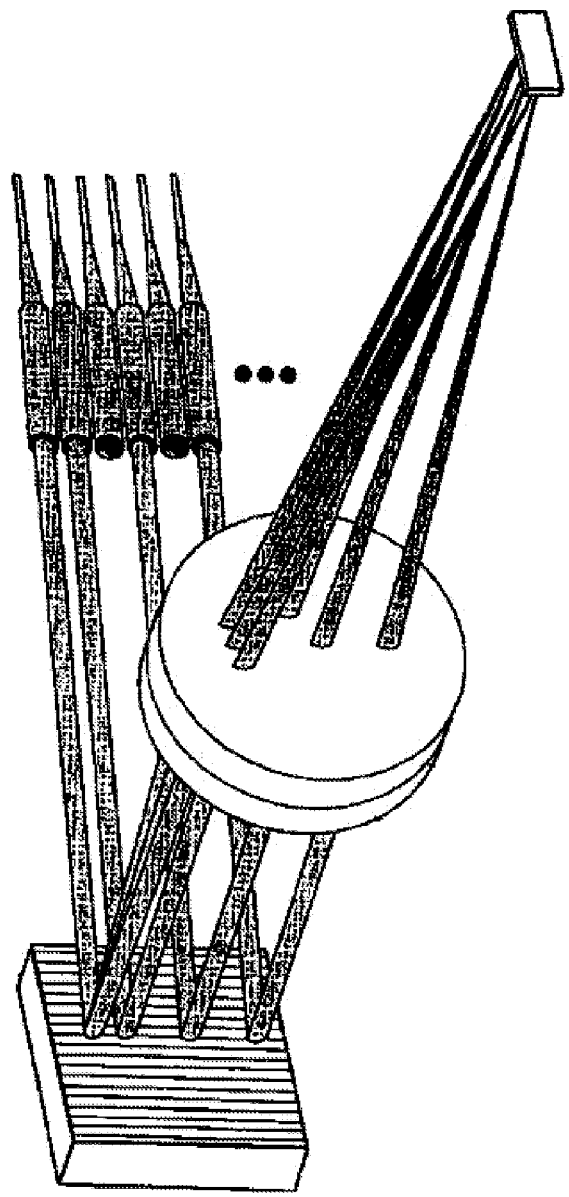
FIG. 3 is a perspective view of a third prior art WSS device.

Referring initially to FIGS. 1 to 3, there are illustrated examples of known wavelength selective switches (WSS). FIG. 1 illustrates an LCOS-based WSS utilizing a reflective liquid crystal phase matrix to switch wavelength channels (from U.S. Pat. No. 7,397,980 entitled "Dual-Source Optical Wavelength Processor" to Frisken and assigned to Finisar Corporation). FIG. 2 illustrates a MEMS-based WSS device utilizing a two-dimensional array of reflective micro electromechanical (MEMS) mirrors for steering and switching wavelength channels (from U.S. Pat. No. 7,408,639 entitled "Tunable Optical Routing System" to Strasser et al. and assigned to Nistica, Inc.). FIG. 3 illustrates another MEMS-based switch (from Reissued U.S. Pat. No. RE39,411 entitled "Reconfigurable All-Optical Multiplexers With Simultaneous Add-Drop capability" to Belser et al. and assigned to Capella Photonics, Inc.).

Figure 4:
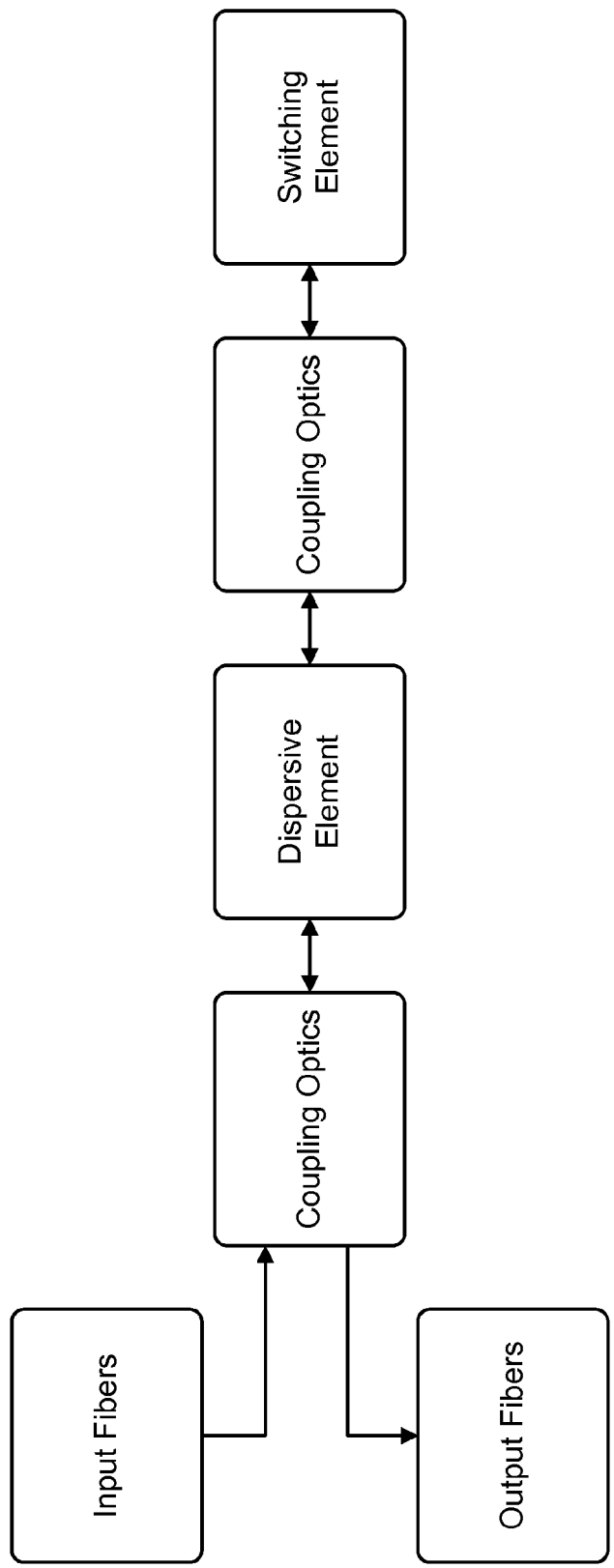
FIG. 4 is a schematic block diagram illustrating the primary common elements of typical WSS devices.

Considered collectively, the devices of FIGS. 1 to 3 all share the common elements illustrated schematically in FIG. 4, for which reference is now made. The input fibers project one or more multiplexed optical beams for processing, the dispersive element separates individual wavelength beams from the multiplexed beams and the reflective switching element selectively steers the wavelength beams back through the system to predetermined output ports. Similar devices can be constructed using transmission switching elements.

Common diffractive elements include diffraction gratings, while common switching elements include MEMS or LCOS arrays. It is well-known that the performances of these optical elements are quite sensitive to beam geometries such as incident angles and beam sizes. Therefore, specific coupling optics are needed to satisfy the sensitive requirements of the elements.

While these systems perform relatively well for low port counts and small beam sizes, aberrations become particularly prominent as port counts and beam sizes increase.

The improvements to optical systems described herein have been developed particularly for use in LCOS-based WSS devices such as that disclosed in U.S. Pat. No. 7,397,980 and illustrated schematically in FIG. 1. The subject matter of this published patent is incorporated herein by way of cross-reference. Such WSS devices require polarization diversity optics as liquid crystal elements are polarization dependent. Accordingly, the present improvements will be described in terms of relative decreases in PDL to such a system. However, PDL and other optical losses arise in other non-polarization diverse systems due to optical aberrations. More generally, however, it will be appreciated that the improvements/modifications of the present disclosure can be adapted for implementation in other optical switching devices such as those employing MEMS mirror arrays and, more generally, in other optical devices such as optical channel monitors.

Referring again to FIG. 1, WSS device 1 includes input/output optical fibers 3, optical power elements in the form of a cylindrical mirror 5 and lens 7, a wavelength dispersive grism 9 and an LCOS based switching element 11. Device 1 is configured to spatially disperse wavelength channels in the y dimension and angularly switch beams between ports in the x dimension.

In such LCOS based WSS systems, polarization diversity optics are required as the LCOS device may be a polarization dependent element which only acts on one particular polarization state. In the case of WSS 1, the diversity optics includes a walk-off crystal 13 and birefringent wedge 15 to split the beams into orthogonal polarization states, and a half wave plate 16 for rotating one of the orthogonal components so as to align the polarization states. The two polarization components, now having a common orientation, are propagated separately through the optical system. If the optical paths traversed by each polarization state through the system are not identical, a relative loss, or PDL, is experienced between the two states. Similar polarization diversity techniques are employed in other known optical systems having polarization dependent elements.

Overview of Field Curvature Aberration and Associated Loss

Figure 5:
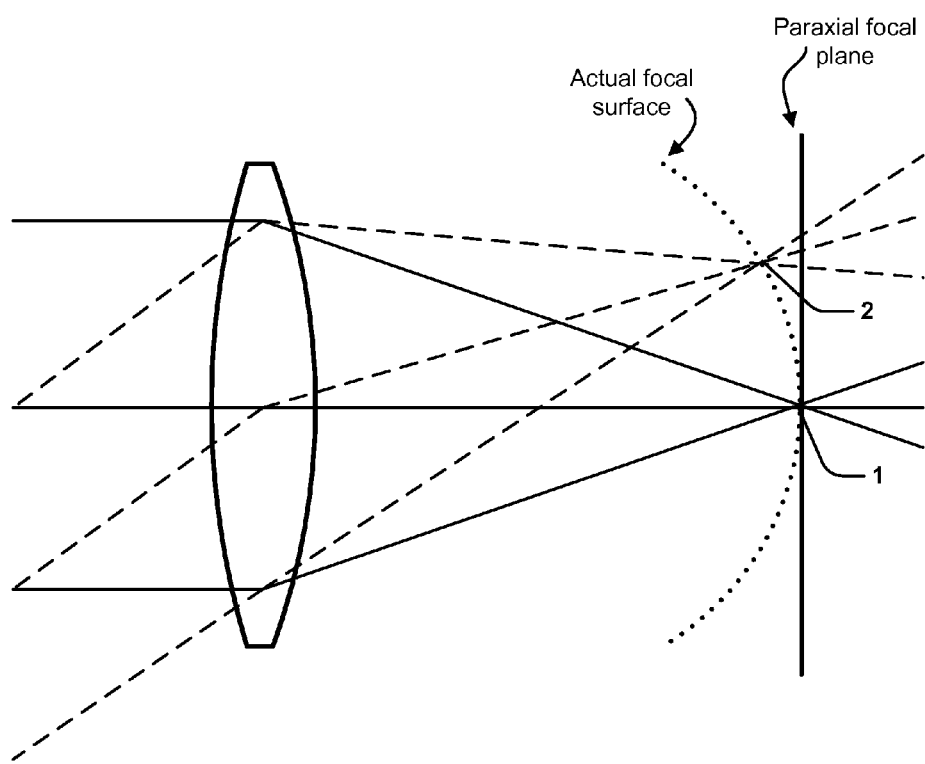
FIG. 5 is a ray diagram illustrating field curvature aberration through a lens.

A first example of optical aberration experienced in the above systems is field curvature, which is of primary concern in the above optical systems. Referring to FIG. 5, there is illustrated a ray diagram of a lens demonstrating field curvature effects. As illustrated, paraxial rays (solid lines) directed parallel to the horizontal optical axis are focused to a point 16 on an ideal focal plane. However, off-axis directed optical rays (dashed lines) focus light to a point 17 before the ideal focal plane. Generally, light is focused to a curved field surface defined by the ray's angle of incidence. This is true for most typical focusing/collimating optics including lenses and curved mirrors. Therefore, an angular dependent focusing is experienced.

Figure 6:
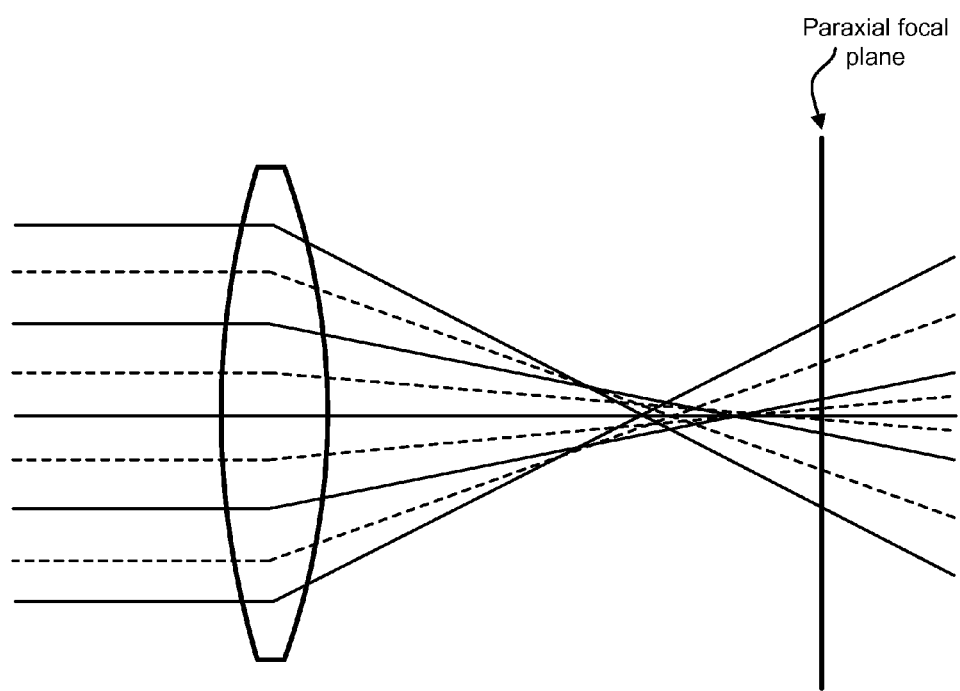
FIG. 6 is a ray diagram illustrating spherical aberration through a lens.

A second example aberration is spherical aberration, which arises from the imperfect focusing of curved lenses and mirrors. Referring now to FIG. 6, there is illustrated a ray diagram of a lens demonstrating spherical aberration effects. Here, all rays are paraxial but strike the lens at different radial positions. Rays that pass through the periphery of the lens are focused to a closer point than rays passing through the center of the lens. Therefore, a radial position dependent focusing is experienced.

In situations where the different rays represent separate wavelength channels or different polarization states, relative losses are experienced. For example, spatially separated polarization components will not converge to a precise point on a desired switching plane, leading to PDL. Identification and reduction of these losses are important as they determine the fundamental performance of an optical system.

Figure 7:
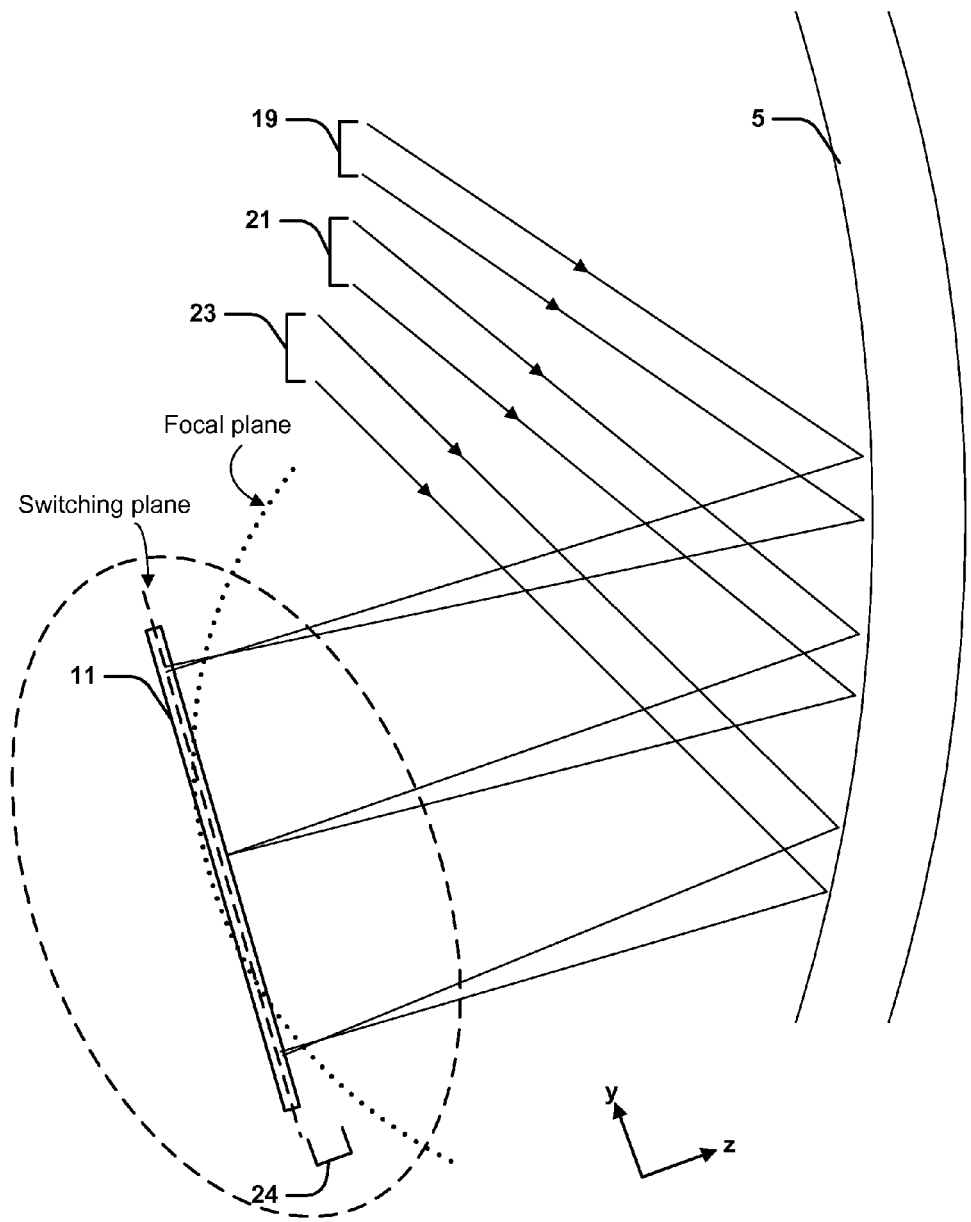
FIG. 7 is a sectional plan view and ray diagram of the WSS of FIG. 1, focusing on the cylindrical mirror and LCOS device.
Figure 8:
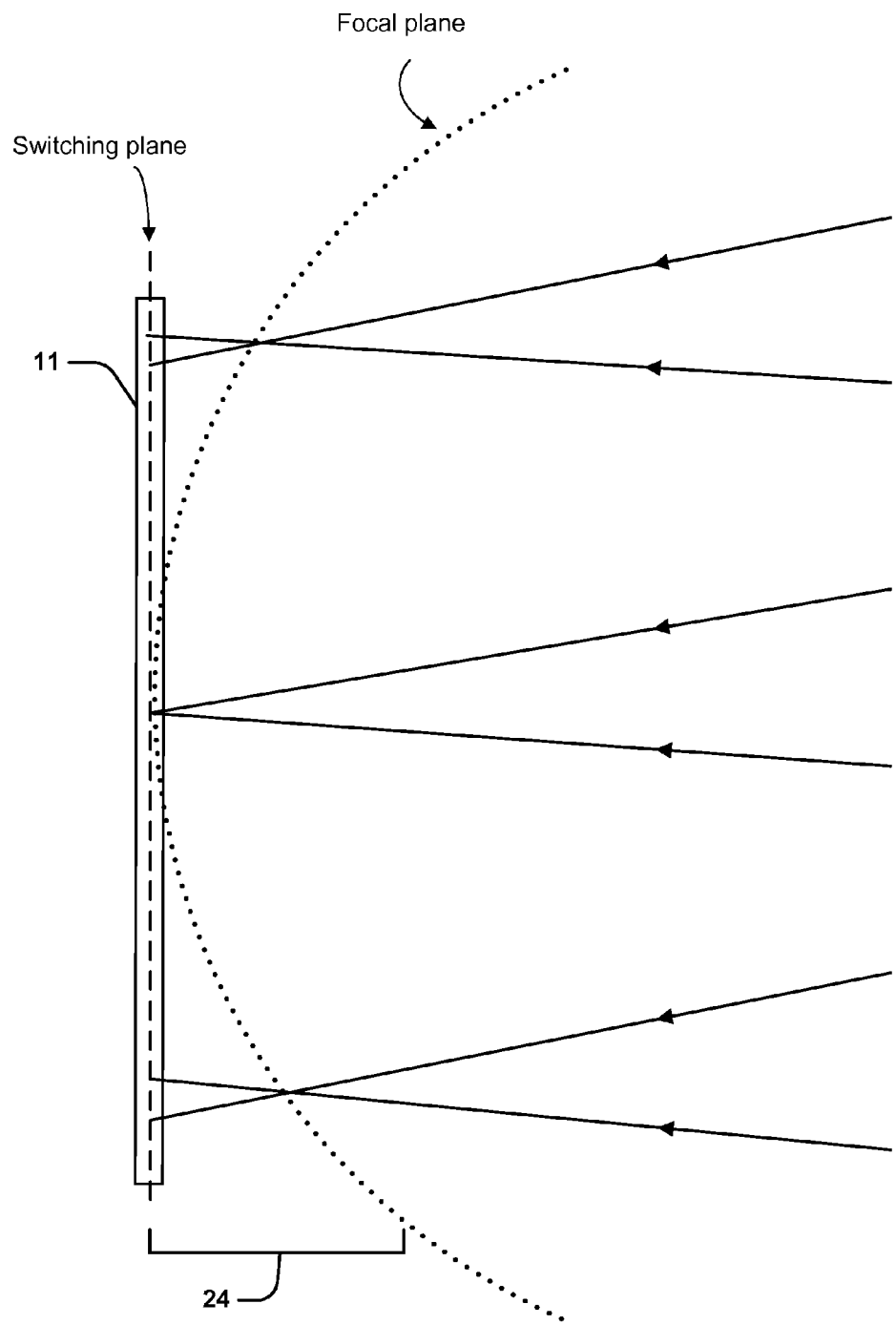
FIG. 8 is an enlarged view and ray diagram of the LCOS device of FIG. 7.

To illustrate the above aberrations in an optical system, reference is now made to FIGS. 7 and 8. FIG. 7 shows a sectional plan view of WSS 1 of FIG. 1, including cylindrical mirror 5 and LCOS device 11, and FIG. 8 illustrates a close-up of the beams incident onto the surface of the LCOS device 11, as shown in the dashed oval of FIG. 7. FIG. 7 shows three pairs of orthogonally polarized beams 19, 21, 23, which originate from a single input beam that has been spatially separated into constituent polarization components, angularly dispersed and subsequently collimated. Therefore, each beam pair possesses a different wavelength and the beams of each pair represent similarly oriented polarization states, as modified by the polarization diversity optics.

Beams 19, 21 and 23 are reflected off mirror 5 and incident onto LCOS device 11. As best shown in FIG. 8, the central pair 21 of polarized beams are focused together substantially at the LCOS device or switching plane, while the peripheral beam pairs are focused at points short of the LCOS device by a distance 24 along a curved focal plane. The position where these polarized beams converge on the curved focal plane is referred to as the polarization cross-over point.

The result of this focal plane curvature is that the peripheral polarized beams are not focused to a point at the LCOS plane but are slightly spatially and angularly separated. Accordingly, each polarization state is switched to a slightly different degree and the states are not equally coupled to a single output fiber, thereby giving rise to PDL. That is, if the polarization states are slightly separated at the LCOS device, then they cannot be perfectly recombined at the coupling fibers and are therefore separated when entering the fibers.

Due to the curvature of the focal plane, the effect of PDL increases with increasing radial distance from the center of mirror 5 and increasing angular incidence onto mirror 5. Therefore, wavelength beams striking peripheral regions of the LCOS device 11 experience more PDL than beams incident onto central regions of the LCOS device. Similar field curvature aberration can be experienced at the add/drop and common port fibers, wherein the PDL effects are enhanced at higher off-axis fibers.

Figure 9:
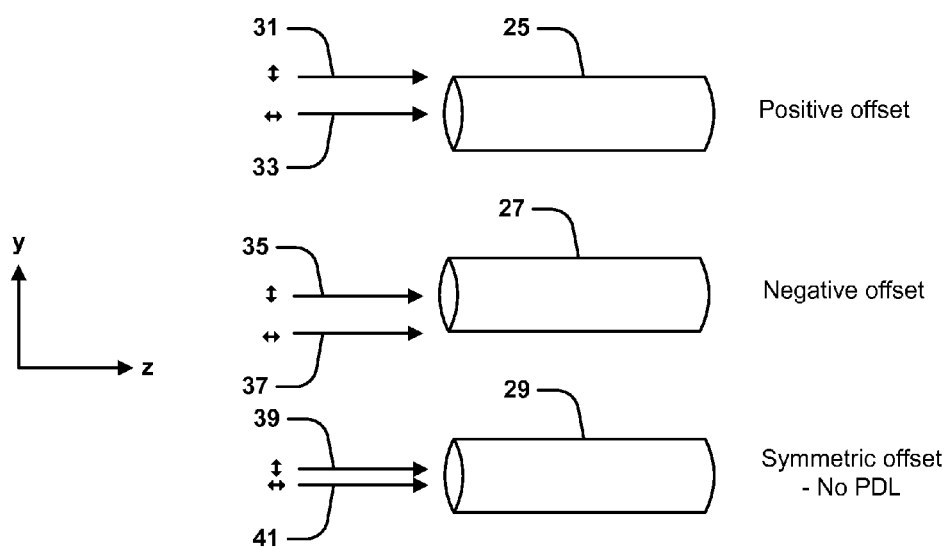
FIG. 9 is a plan view of polarized beam pairs coupled to three optical fibers positioned at different locations in the switching dimension.

To demonstrate how the imperfect focusing leads to miscoupling and PDL, reference is now made to FIG. 9, which illustrates a plan view of optical beams coupled to three fibers 25, 27 and 29. Each beam pair corresponds to the two orthogonal polarization states of an input beam. At fiber 25, beams 31 and 33 have both been shifted upward and the horizontal polarization component is coupled more efficiently than the vertical polarization component. Similarly, at fiber 27, beams 35 and 37 have both been shifted downward and the vertical polarization component is coupled more efficiently than the horizontal polarization component. These situations occur when beams 31, 33, 35 and 37 strike the peripheral regions of the LCOS device. At fiber 29, beams 39 and 41 are closely confined and symmetric about the fiber. As equal power from each component is coupled to fiber 29, no PDL is experienced. Beams 39 and 41 correspond to paraxial beams that propagate closer to the optical axis.

Figure 10:
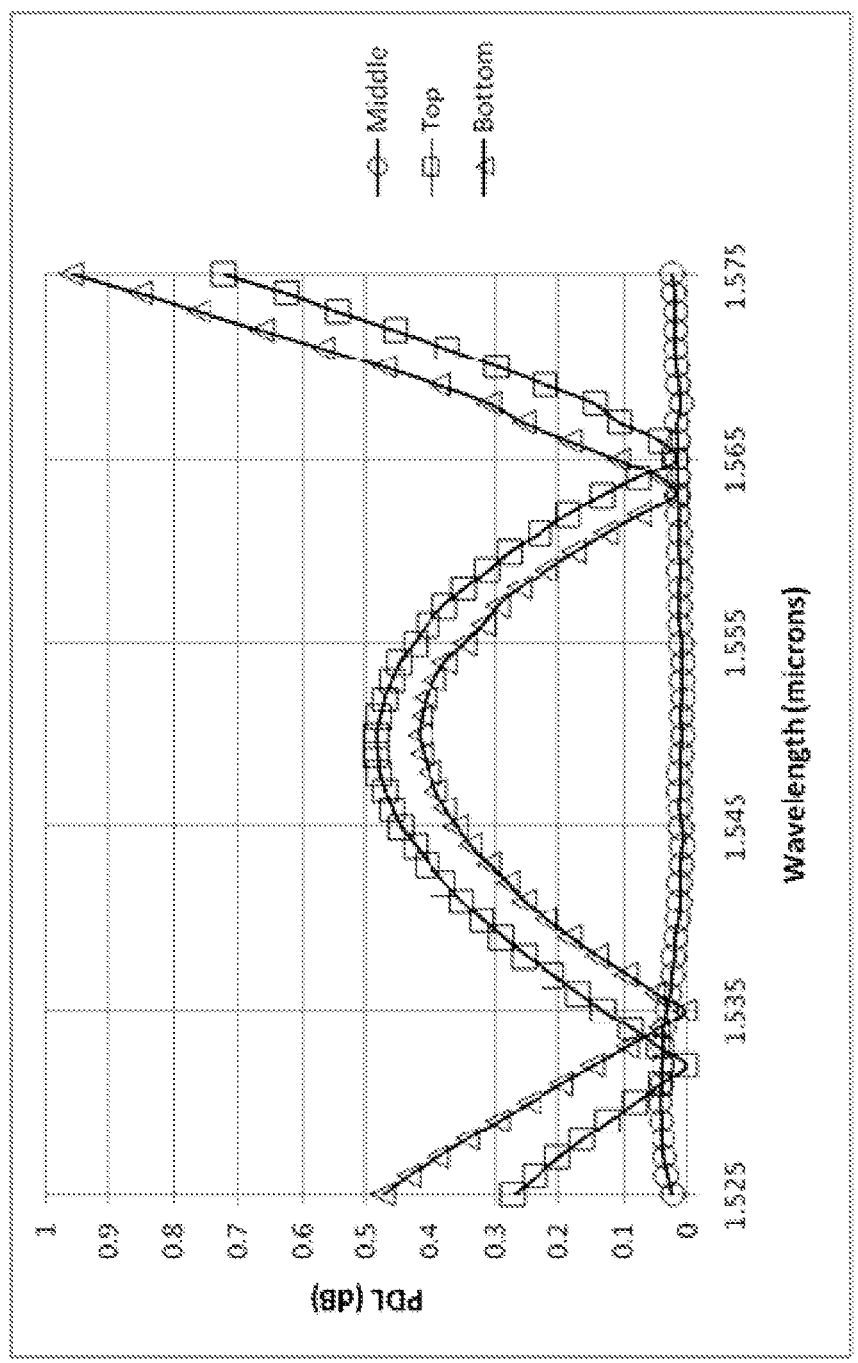
FIG. 10 is a graph of PDL versus wavelength for three optical fibers positioned at different locations in the switching dimension for a simulated WSS system incorporating a standard glass grism.
Figure 11:
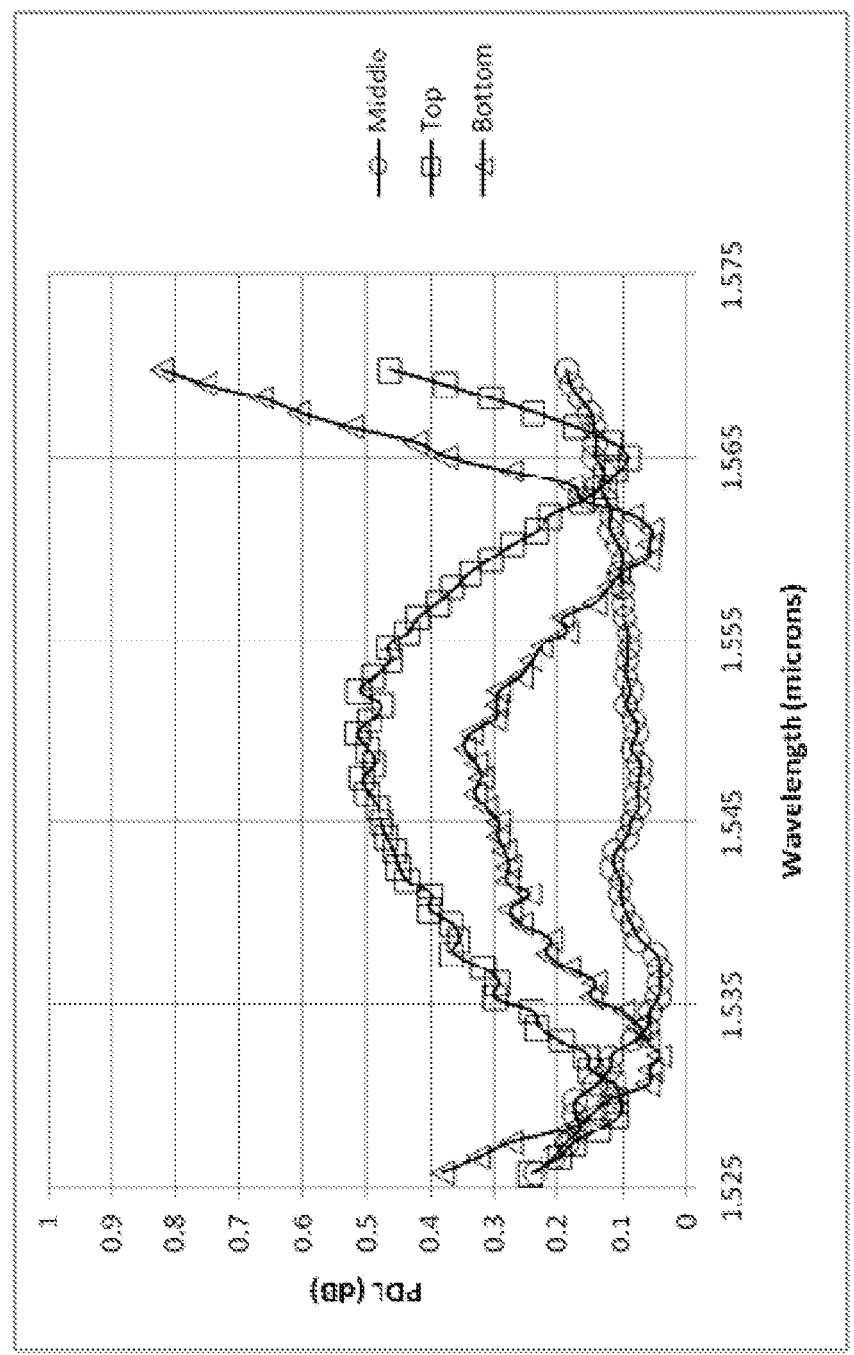
FIG. 11 is a graph of PDL versus wavelength for three optical fibers positioned at different locations in the switching dimension for a real tested WSS system incorporating a standard glass grism.

To illustrate example PDL effects resulting from the above aberrations, reference is now made to FIGS. 10 and 11, which show respectively plots of PDL versus wavelength for a simulated and real optical system similar to WSS device 1 of FIG. 1 but with a large number of input/output fibers (high port count). Both plots show data for three different output fibers; one positioned on the optical axis (designated middle) and two at opposite distant peripheral positions above and below the optical axis (designated top and bottom). The middle paraxial fiber shows almost zero PDL for all wavelengths as, close to the optical axis, both polarization components are recombined and equally coupled at the output fibers. At the peripheral ports, where accurate recombination of polarization states does not occur, the PDL is dependent upon the wavelength. The zero PDL points for each off-axis curve indicate the wavelengths where the polarization states are focused at the LCOS switching plane. The offset between PDL curves of the top and bottom fibers indicates that the switching paths between fibers are different and therefore the low PDL points occur at different wavelengths.

FIGS. 10 and 11 highlight two important facts: firstly that the PDL is port dependent; and secondly that it is possible to optimize the system at particular wavelengths, wherein the central rays for each polarization state are coupled with minimal PDL. However, this can only be achieved for a maximum of two wavelengths across the spectrum for off-axis ports. Unfortunately, this is unsuitable for systems switching large numbers of wavelength channels and having high port counts.

Solutions for Reducing Aberrations

Two primary techniques for addressing the above aberrations are provided herein. The first involves reducing the curvature of the focal plane at the LCOS device such that the separated polarization states converge at the LCOS at substantially the same point along the optical axis for all wavelengths. In this case, an axial offset at the LCOS device will not produce large PDL at the coupling fibers. The second solution is to configure the coupling optics adjacent the input and output fibers to address any offset in the optical beams, such that the separated polarization states couple symmetrically to respective fibers. Both techniques are possible in systems implementing other switching elements such as MEMS mirrors. Further, these two techniques may be implemented together or separately.

Silicon Grism

One method of achieving the first technique is to implement an appropriately configured silicon grating-prism (grism) element as the diffractive element. This element can replace the standard glass grism 9 in WSS 1 of FIG. 1, or replace the diffraction grating in the systems of FIGS. 2 and 3. Silicon has a much higher refractive index than most glasses. At a wavelength of 1550 nm, silicon has a refractive index of about 3.48.

Referring again to FIG. 1, if the silicon grism is disposed in a specific orientation, the high refractive index grism acts to shorten the effective wavelength of beams propagating therein. The shorter wavelength means that the required incident angles (away from normal) onto the diffraction grating can be relaxed, thereby allowing the beams to strike the grating much closer to normal incidence. This reduction in incidence angle, in turn, reduces the angles that the beams are incident onto mirror 5, which subsequently reduces the focal plane curvature of that mirror. Therefore, each beam is more efficiently and evenly focused onto LCOS device 11. The more accurate focusing allows the LCOS device 11 to switch more accurately to a desired output fiber. The reduced incident angles onto the diffraction grating of the grism also provides for path length compensation between wavelength channels and allows the size of the grism to be reduced, which has advantages associated with cost and overall optical device size.

Figure 12:
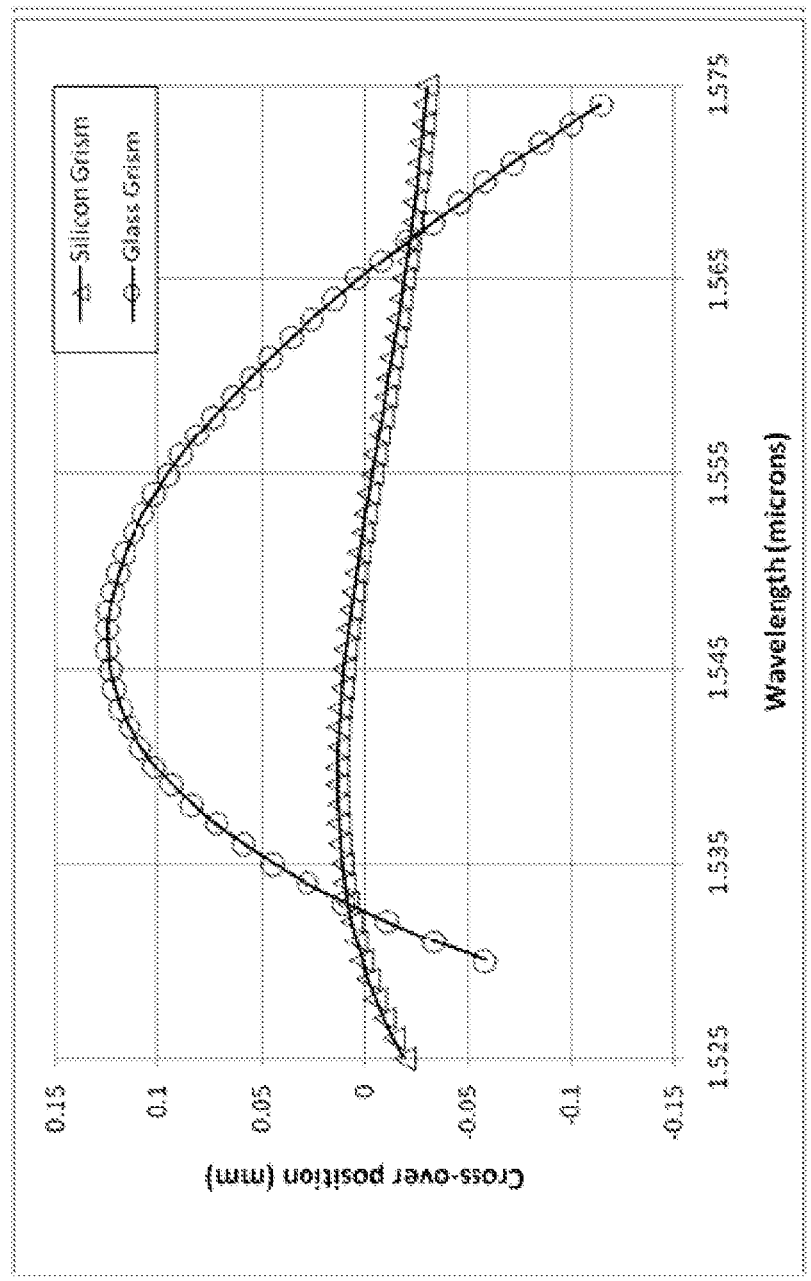
FIG. 12 is a graph of the polarization cross-over point versus wavelength for a standard glass grism and a silicon grism.

To illustrate this focal plane flattening, reference is made to FIG. 12, which illustrates a graph of the polarization crossover point versus wavelength. The polarization cross-over point is defined as the point where two spatially separated polarization components are focused together and converge for a given wavelength channel. Examples of the polarization cross-over point can be seen in FIG. 8 where the rays converge on the curved focal plane. In FIG. 12, data are plotted for simulated systems implementing both a standard glass grism (with refractive index of approximately 1.55) and a silicon grism. As shown, the silicon grism provides much smaller wavelength dependence for the polarization crossover point than the standard glass grism. As wavelengths are separated spatially, this flatter curve represents a flatter focal plane.

Figure 13:
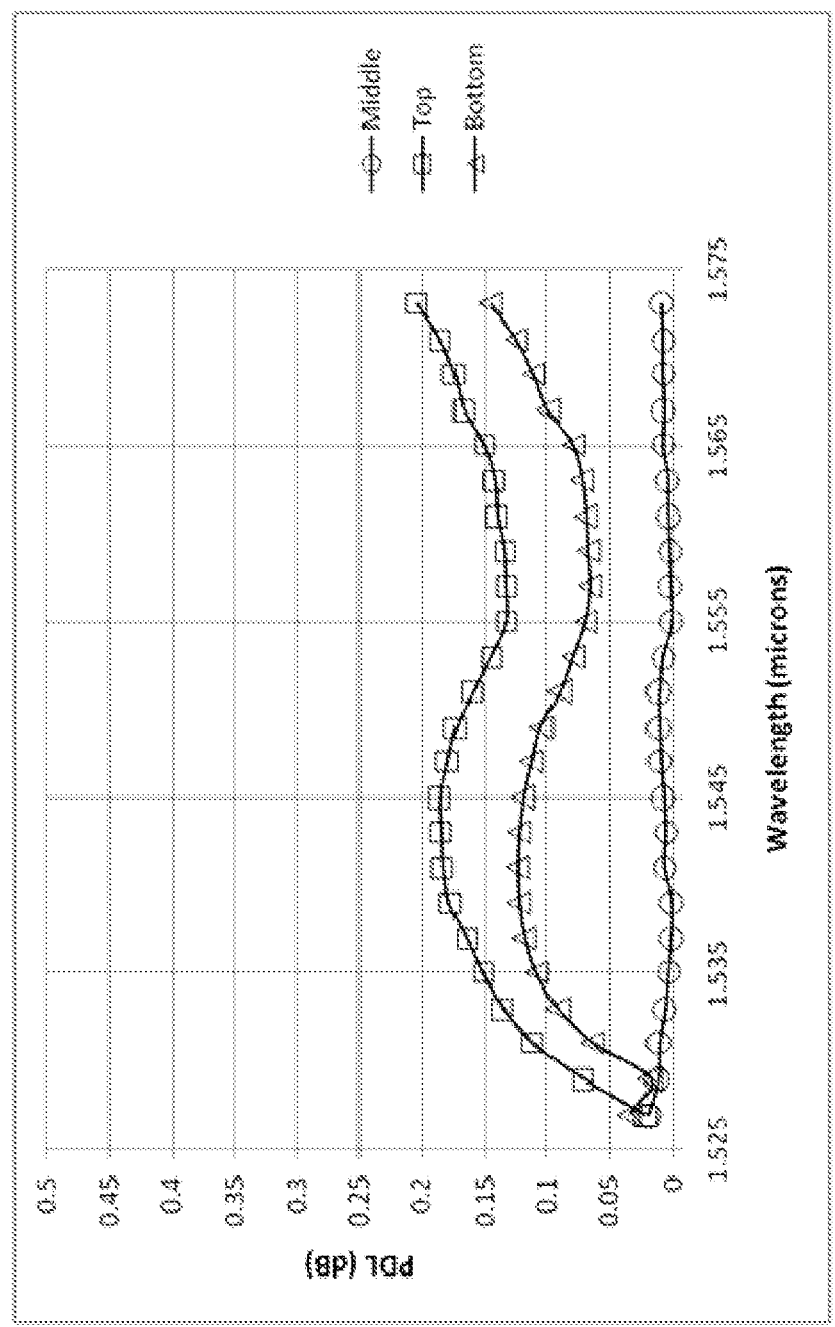
FIG. 13 is a graph of PDL versus wavelength for three optical fibers positioned at different locations in the switching dimension for a simulated WSS system incorporating a silicon grism.

A flatter focal plane leads to reduced PDL as the LCOS device switches each polarization component along substantially the same trajectory. Referring now to FIG. 13, there is illustrated a graph of PDL versus wavelength for a simulated system incorporating a silicon grism. As with FIGS. 10 and 11, data in FIG. 13 are plotted for a middle port on the optical axis, as well as two peripheral ports disposed off the optical axis (top and bottom). Comparing FIG. 13 with those of FIGS. 10 and 11, it is seen that, using the silicon grism, the PDL for all three ports is much lower and has a generally flatter wavelength dependence (noting the different vertical scales between the different figures). In particular, the PDL is now less than 0.2 dB for all ports, which is approximately a 3 fold improvement over the system without a silicon grism.

Figure 14:
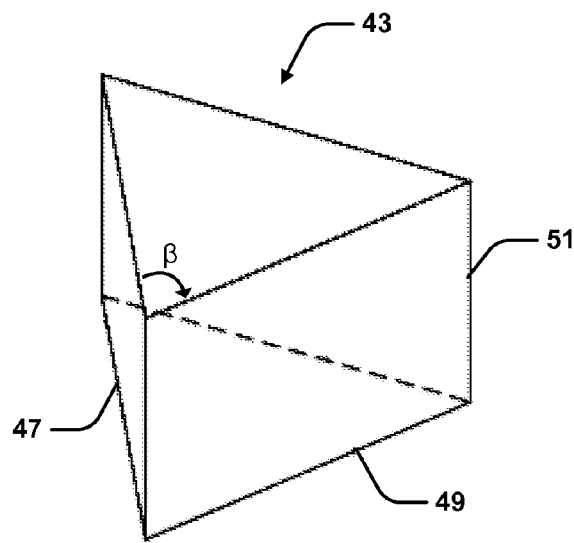
FIG. 14 is a perspective view of the prism portion of a silicon grism.
Figure 15:
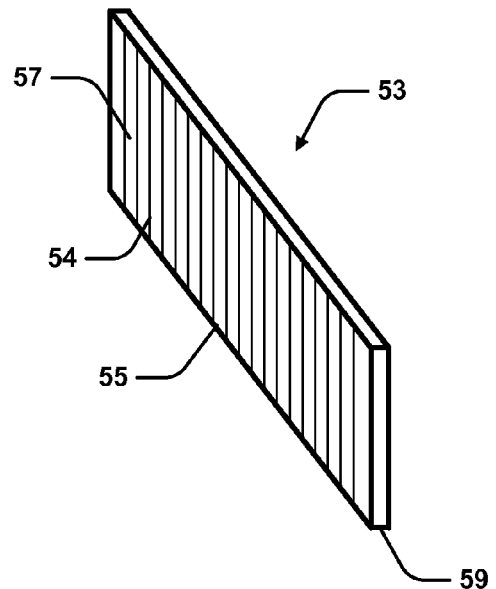
FIG. 15 is a perspective view of the diffraction grating portion of a silicon grism.
Figure 16:
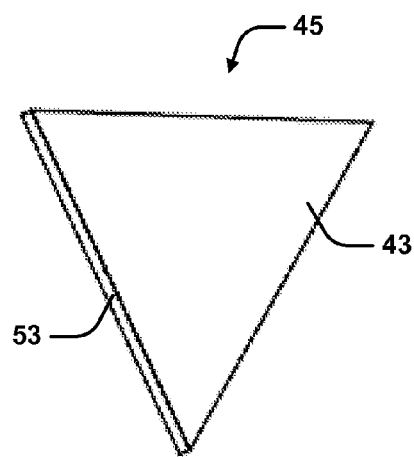
FIG. 16 is a plan view of a silicon grism.

Referring now to FIGS. 14 to 16, an example silicon grism will now be described. Referring initially to FIG. 14, there is illustrated a plan view of the triangular prism portion 43 of grism 45. Prism 43 is formed entirely of silicon and is preferably coated in an antireflection coating that restricts reflection to less than 0.2% over a predefined wavelength range covering substantially the IEEE designated C band of the electromagnetic spectrum (1530 nm to 1570 nm). In other embodiments, the antireflection coating restricts reflection over other wavelength ranges. In further embodiments, no antireflection coating is provided.

Turning now to FIG. 15, there is illustrated a perspective view of the diffraction grating portion 53 of grism 45. Like prism 43 of FIG. 14, grating 53 is formed entirely from silicon. Grating 53 has a periodic groove structure 54 and is configured to operate efficiently over the IEEE C band of the electromagnetic spectrum or a predetermined wavelength range within the C band. However, it will be appreciated that other designs and configurations of grism can be used.

Turning to FIG. 16, there is illustrated a plan view of grism 45 with prism 43 optically connected to grating 53. This figure highlights another advantage arising from both prism 43 and grating 53 being formed of silicon; the capability to directly connect the prism and grating. In particular, one of the drawbacks of typical glass grisms used in commercial systems is the joint between the diffraction grating and the prism. If an optical adhesive is used, then the refractive index of the prism and adhesive must be matched extremely well to avoid loss and interference fringes. Furthermore, the diffraction grating, adhesive and prism must have similar mechanical properties to avoid stress at this joint over various environmental conditions.

It is therefore desirable to remove the need for an adhesive to reduce problems arising from a mismatched prism/grating connection. Using the same material for the diffraction grating and prism eliminates a mismatch in mechanical properties, and also allows the components to be optically connected to one another by Van der Waals forces, rather than adhesive materials.

The abovementioned technique of incorporating a silicon grism has some other advantageous effects, particularly in high port count systems utilizing highly asymmetric beams. In current high port count WSS devices utilizing LCOS switching elements, beams are effectively made to be highly elliptical when they are incident onto the LCOS. In the switching axis, the beams are collimated and large in diameter for effective switching, while in the dispersion axis the beams can be focused to small diameters to give the WSS device high wavelength resolution. In certain circumstances, the silicon grism can act to rotate the eccentricity of the elliptical beams upon reflection. This occurs when the beam does not strike the grating at normal incidence in the switching axis, or is not collimated. If the beam is perfectly collimated and strikes the grating at normal incidence, then the spectral line will ideally not show these effects.

These changes in beam profile on the LCOS can have a negative effect on channel shapes and channel isolation, and has been found to be particularly evident in bidirectional twin-type architectures wherein angular incidence of beams is larger.

Through its higher refractive index, a silicon grism can be used to reduce the angular range of the beam incident on the grating, allowing much larger beams to be focused onto a grating without negative effects on the system. Here, refraction at the air/silicon interface will reduce the angles of the rays according to Snell's Law, and the high refractive index of silicon means that this is a significant effect. Similar advantages would be seen in other optical systems incorporating highly asymmetric beam profiles.

Curved Coupling Lens

Figure 17:
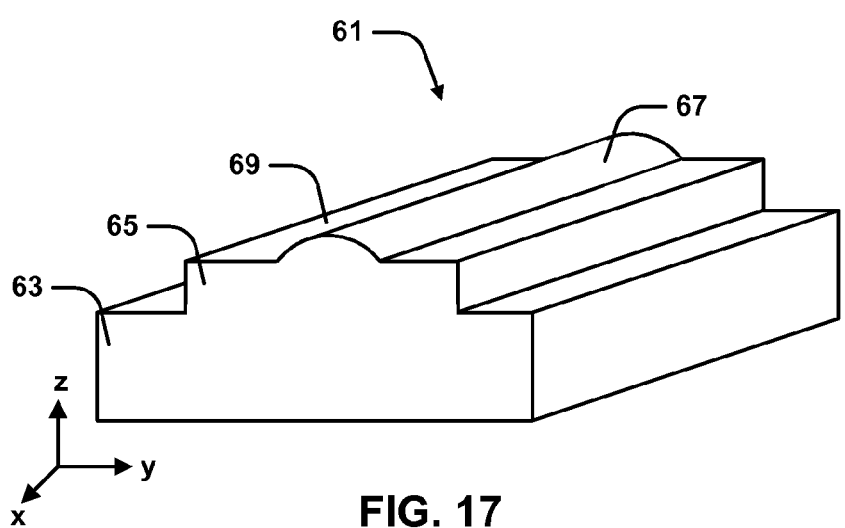
FIG. 17 is a perspective view of a standard coupling lens used in conventional WSS systems.

The second technique for addressing aberrations is to alter the output coupling optics to compensate for spatial offsets in the optical beams after propagation through the system. Referring to FIG. 17 there is illustrated a perspective view of an example conventional lens 61 for coupling optical beams to and from optical fibers. Lens 61 is an example of the type that is typically implemented in the coupling optics adjacent input/output fibers in systems such as those illustrated in FIGS. 1, 2 and 3, and can be incorporated in conjunction with other coupling lenses. For example, lens 61 could be implemented as coupling element 62 in FIG. 1.

As shown in FIG. 17, lens 61 includes a rectangular box-shaped body 63 having a protruding front portion 65. A linearly longitudinally extending curved ridge 67 is located in a front face 69 of portion 65 to provide focusing power in the dispersion dimension. Using the system of FIG. 1 for reference, ridge 67 extends linearly in the x dimension, which is the switching dimension or direction of fiber displacement.

The configuration of these conventional coupling lenses assumes the incident beams will arrive in an ideal alignment with the corresponding fibers, which are disposed in the switching dimension. However, due to aberrations, the beams actually arrive at a position in the dispersion dimension that is proportional to the distance from the optical axis in the switching dimension. That is, beams arriving at distant off-axis fibers are laterally displaced in the dispersion dimension from the optical axis.

Referring now to FIGS. 18 to 21, there is illustrated various views of an alternative coupling lens 71, which can be used as an alternative to lens 61 of FIG. 17 to correct for aberrations. Lens 71 includes a rectangular box-shaped body 75 with a longitudinally extending arcuate ridge 77 disposed in a front surface 79 of the front portion 75. The ridge 77 has a convex radius of curvature in the y-z plane for collimating light. The convex ridge defines a focusing/collimating region having optical focusing power. In some embodiments, the convex ridge has a focal length in the range 200 µm to 2 mm.

Figure 20:
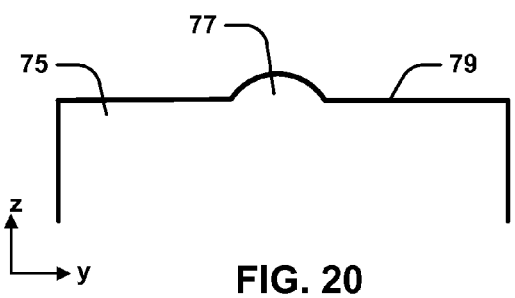
FIG. 20 is a cross section of the curved lens of FIG. 19, taken along line A-A.
Figure 21:
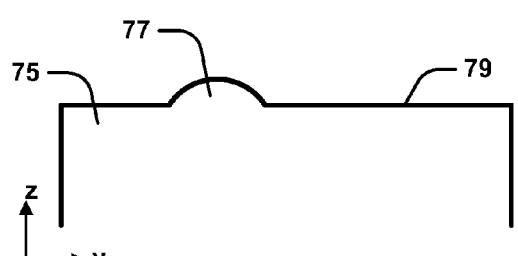
FIG. 21 is a cross section of the curved lens of FIG. 19, taken along line B-B.

Ridge 77 is also curved in the y or dispersion dimension such that it is laterally centered at each end 81 and 83 of body 75, as shown in the cross section of FIG. 20, but laterally displaced in the middle of body 75, as shown in the cross section of FIG. 21. In another embodiment, curved ridge 77 is laterally centered in the middle of body 75 and laterally displaced at each end 81 and 83 of body 75. In further embodiments, ridge 77 is positioned at different lateral locations on body 75. The radius of this longitudinal curvature of ridge 77 is preferably in the order of meters. In exemplary embodiments, the radius of longitudinal curvature of ridge 77 is in the range 1 to 10 m. It will be appreciated, however, that the dimensions of lens curvature will vary depending on the particular optical system. For clarity, this curvature is exaggerated in FIGS. 18 to 21.

It will be appreciated that, in other embodiments, lens 71 has different structural forms. In one embodiment, body 75 is simply rectangular box-shaped and the arcuate ridge 77 projects from one face of the box. In another embodiment, body 75 includes two projecting side regions, which extend longitudinally either side of the arcuate ridge 77.

Figure 18:
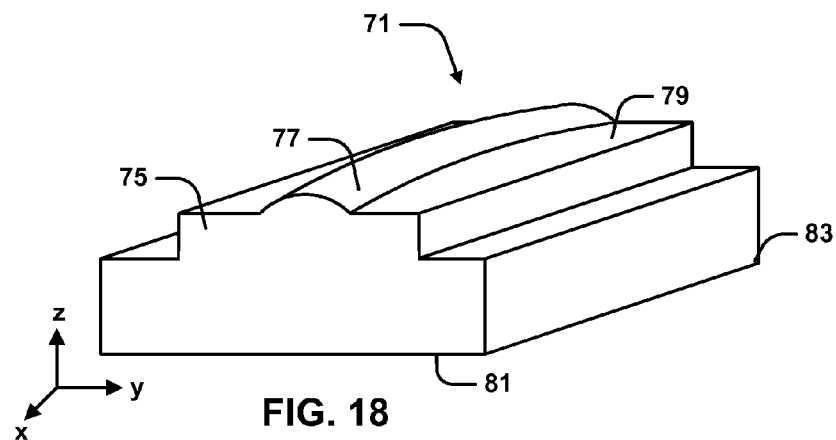
FIG. 18 is a perspective view of a coupling lens modified to have a curved focusing profile in the dispersion dimension for correcting optical aberrations.
Figure 19:
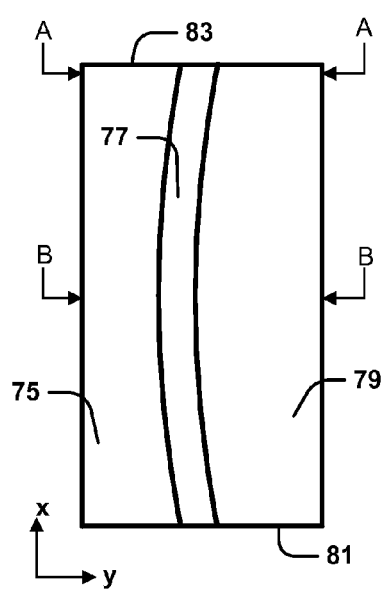
FIG. 19 is a plan view of the curved lens of FIG. 18.
Figure 22:
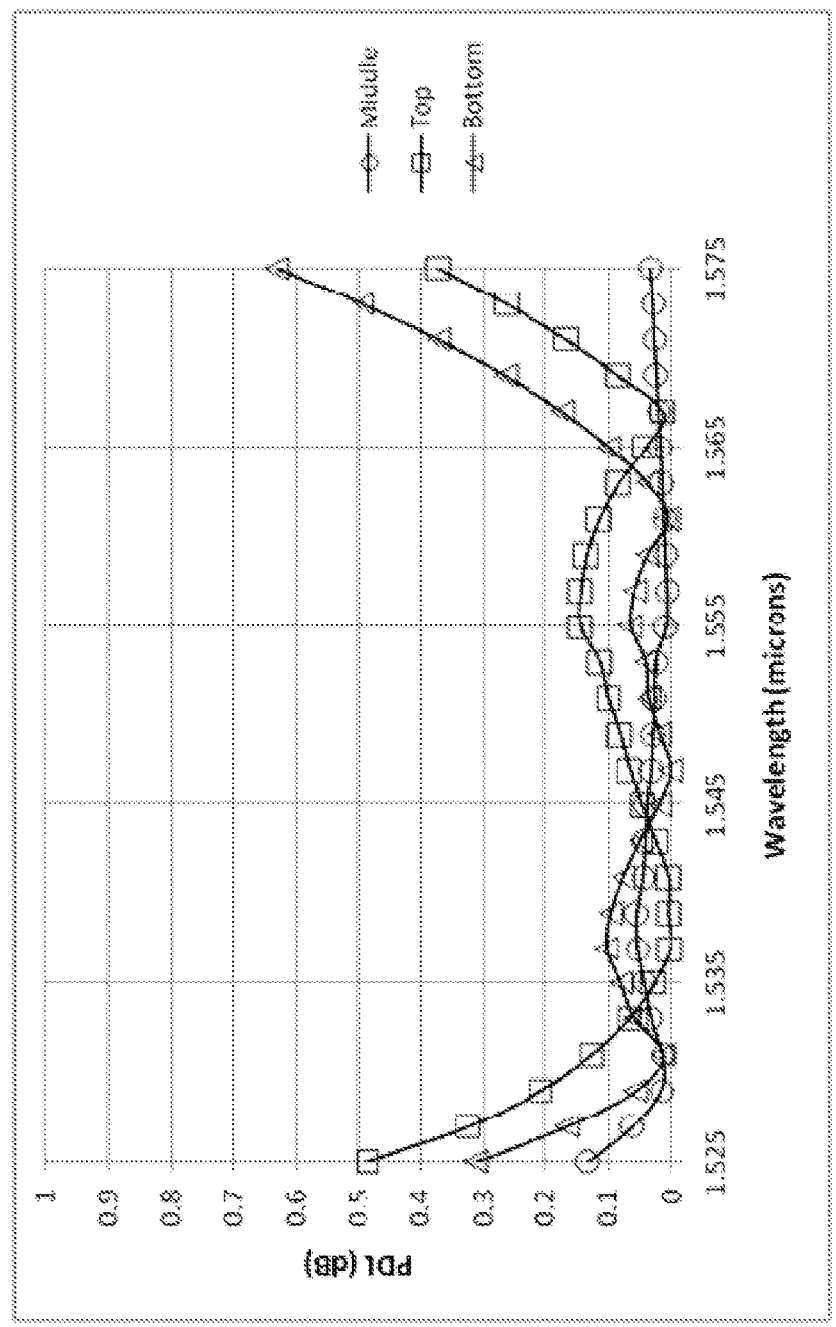
FIG. 22 is a graph of PDL versus wavelength for three optical fibers positioned at different locations in the switching dimension for a simulated WSS system implementing a curved corrective lens as shown in FIGS. 18 to 21.

Referring to FIG. 22, there is illustrated simulated data of PDL versus wavelength for a system incorporating a curved lens as described in relation to FIG. 18. Data are plotted for the same fibers as in FIGS. 10 and 13, that is, one positioned on the optical axis (designated middle) and two at opposite distant peripheral positions above and below the optical axis (designated top and bottom). FIG. 22 shows PDL results for a curved lens having a radius of curvature of 5.0 m, which is the optimum curvature to minimize the aberrations in this particular system. This simulated lens was designed for operation within the IEEE C band. Within this range, the simulated lens maintains PDL to below about 0.2 dB. This is significantly less than the result of FIG. 10, without aberration compensation.

The radius of curvature of the curved lens that produces the lowest PDL will depend upon the particular optical system in which the lens is used. Generally, however, the radius of curvature will be in the order of meters. Further, the direction of curvature of the curved lens can be in opposite directions in the dispersion plane depending on the particular optical system.

While described separately, it will be appreciated that both the silicon grism and curved lens can be simultaneously incorporated into an optical system to further reduce optical aberrations and resulting losses.

The curved lens described above only corrects for aberrations in the dispersion plane. This is because in optical systems incorporating LCOS devices, such as WSS 1 of FIG. 1, the LCOS device can be configured to correct for aberrations in the switching dimension. Therefore, no further correcting in that axis is necessary. However, in other systems where no suitable switching axis correction is available, such as in some MEMS-based systems, it will be appreciated that a similar type curved lens could be incorporated to correct for aberrations in the switching plane by providing curvature in that dimension.

Conclusions

It will be appreciated that the disclosure above provides various significant systems and methods for reducing off-axis optical aberrations in wavelength dispersed devices.

In the present disclosure, two techniques are described for reducing aberrations in optical systems: implementation of a high refractive index silicon grism as a diffracting element; and incorporating a correcting lens having a curved spatial profile into the system for coupling to output fibers. Comparing the data illustrated in FIGS. 13 and 22 to 24 with the data illustrated in FIG. 10, it can be clearly seen that both techniques significantly reduce the PDL experienced in the system, both at central axial ports and at peripheral ports far off the optical axis. Further, both the silicon grism and the curved correcting lens can be simultaneously implemented into an optical system to further reduce PDL.

Advantages of the presently described techniques include:
Reduced PDL, wavelength dependent loss and port dependent loss, especially for high port count devices.
Reduced device size due to greater efficiency of the high refractive index grism.
Reduced insertion loss for asymmetric beams due to a reduction in rotation of beam eccentricity in the system.
Less need for complex optics to control the shape and position of beams in the optical system.

Interpretation

Throughout this specification use of the terms "c-band" or "IEEE c-band" are intended to mean the wavelength range of 1530 to 1570 nm in the electromagnetic spectrum.

Throughout this specification, use of the term "element" is intended to mean either a single unitary component or a collection of components that combine to perform a specific function or purpose.

Throughout this specification, use of the term "orthogonal" is used to refer to a 90° difference in orientation when expressed in a Jones vector format or in a Cartesian coordinate system. Similarly, reference to a 90° rotation is interpreted to mean a rotation into an orthogonal state.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/ features that follow the term, but not excluding others. Thus, including is synonymous with and means comprising.

It should be appreciated that in the above description of exemplary embodiments of the disclosure, various features of the disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. An optical system including:
    (a) at least one input port for projecting an input optical beam;
    (b) a beam splitting element for spatially separating said optical beam into a plurality of optical sub beams disposed in a first dimension;
    (c) a plurality of output ports disposed in a second dimension for receiving predetermined ones of said plurality of optical sub beams;
    (d) an optical power element for manipulating the beam profiles of said optical sub beams;
    (e) a switching element for selectively switching said optical sub beams along trajectories relative to a central optical axis to predetermined ones of said output ports; and
    (f) means for selectively defining trajectories which reduce optical aberrations in said system arising from beam propagation off the central optical axis.

2. An optical system according to claim 1 wherein said optical aberrations include curvature of the focusing of said optical power element for sub beams propagating along trajectories relative to said optical axis in said first dimension.

3. An optical system according to claim 1 further including a polarization diversity element for spatially separating and recombining orthogonal polarization states from said input optical beam and wherein said means for selectively defining trajectories corrects for position dependent focusing, by said optical power element, of spatially separated polarization states in said first dimension to reduce polarization dependent loss (PDL).

4. An optical system according to claim 2 wherein said means for selectively defining trajectories and said beam splitting element are integral with each other in the form of a diffraction grating-prism (grism) element, the grism having a predetermined refractive index and being positioned at a predetermined orientation such that the angle of incidence of said optical sub beams onto the diffraction grating is at or near normal incidence.

5. An optical system according to claim 4 wherein said grism element is formed substantially entirely of silicon.

6. An optical system according to claim 1 wherein said means for selectively defining trajectories includes a corrective coupling lens having focal properties that vary in said first dimension as a function of distance in said second dimension.

7. An optical system according to claim 6 wherein said corrective coupling lens has a collimating region that varies in position in said first dimension as a function of distance in said second dimension.

8. An optical system according to claim 7 wherein said collimating region of said corrective coupling lens is an arcuate convex ridge extending longitudinally in said second dimension and being curved in said first dimension.

9. An optical system according to claim 8 wherein curvature of said collimating region has a radius of curvature in the range 1 m to 10 m.

10. An optical system according to claim 1 further comprising an optical lens for reducing optical field curvature aberrations, said lens including a longitudinally extending arcuate collimating region having optical power in at least one dimension.

11. An optical lens according to claim 10 wherein said arcuate collimating region is a convex ridge disposed in a face of said lens.

12. An optical lens according to claim 10 wherein said arcuate collimating region has a longitudinal arced radius of curvature in the range 1 m to 10 m.

13. A method of reducing the off-axis trajectory of a wavelength dispersed signal in an optical system, the method including the steps of:
    projecting at least one input optical beam in a direction of an optical axis;
    utilizing a grism having a refractive index higher than glass to spatially disperse, according to wavelength, individual channel signals from said at least one input optical beam; and
    receiving said spatially dispersed channel signals;

wherein the grism is positioned and oriented to provide a means for selectively defining trajectories of said channel signals which reduce optical aberrations in said system arising from signal propagation off the optical axis.

14. A method of routing optical beams between a first port and a set of second ports of an optical system, said method including the steps of:

projecting an optical beam from said first port;

defining trajectories relative to a central optical axis between said first port and predefined ones of said second ports;

splitting said optical beam into a plurality of optical sub beams spatially separated in a first dimension;

manipulating the beam profiles off said optical sub beams in a predefined manner;

selectively switching said optical sub beams along said trajectories to selected ones of said second ports disposed in a second dimension; and providing a means for selectively passively correcting said trajectories to reduce optical aberrations in said system arising from beam propagation off the central optical axis.

15. A method according to claim 14 wherein said means for selectively defining trajectories includes a diffraction grating-prism (grism) element, the grism having a predetermined refractive index and being positioned at a predetermined orientation such that the angle of incidence of said optical sub beams onto the diffraction grating is at or near normal incidence.

16. A method according to claim 14 wherein said means for selectively passively correcting said trajectories includes a corrective coupling lens having an arcuate convex ridge extending longitudinally in said second dimension and being curved in said first dimension.

17. A method according to claim 13 wherein the grism is formed entirely from a single material having a refractive index greater than 3 at a wavelength of 1550 nm.

18. A method according to claim 17 wherein the grism material is silicon.

19. A method according to claim 13 wherein the channel signals are spatially dispersed in a first dimension and said trajectories are selectively defined in the first dimension.

20. A method according to claim 19 wherein the channel signals are coupled to corresponding output ports disposed in a second dimension and said trajectories are selectively defined based on the position of the corresponding output port in the second dimension.

21. A method according to claim 13 wherein each optical beam is spatially separated into constituent orthogonal polarization states for propagation through said system, and wherein the trajectories of said polarization states are selectively defined for reducing polarization dependent loss (PDL).

22. An optical system according to claim 1 wherein said means for selectively defining trajectories includes a diffraction grating/prism (grism) formed entirely of silicon and a corrective coupling lens having focal properties that vary in said second dimension.

* * * * *

UNITED STATES PATENT AND TRADEMARK OFFICE
CERTIFICATE OF CORRECTION

| | | |
|---|---|---|
| PATENT NO. | : 9,046,657 B2 | Page 1 of 1 |
| APPLICATION NO. | : 13/716192 | |
| DATED | : June 2, 2015 | |
| INVENTOR(S) | : Stewart et al. | |

It is certified that error appears in the above-identified patent and that said Letters Patent is hereby corrected as shown below:

On the title page item 57 in the Abstract lines 1-2 should read:

--Described herein.......--

Signed and Sealed this
First Day of March, 2016

Michelle K. Lee
*Director of the United States Patent and Trademark Office*